June 13, 1961

C. J. NEUMANN 2,988,116

ONE-MAN SAW RIG

Filed April 8, 1959

Casmer J. Neumann
INVENTOR.

BY Clarence A O'Brien
and Harvey B. Jackson
Attorneys

June 13, 1961 C. J. NEUMANN 2,988,116
ONE-MAN SAW RIG
Filed April 8, 1959 3 Sheets-Sheet 2

Casmer J. Neumann
INVENTOR.

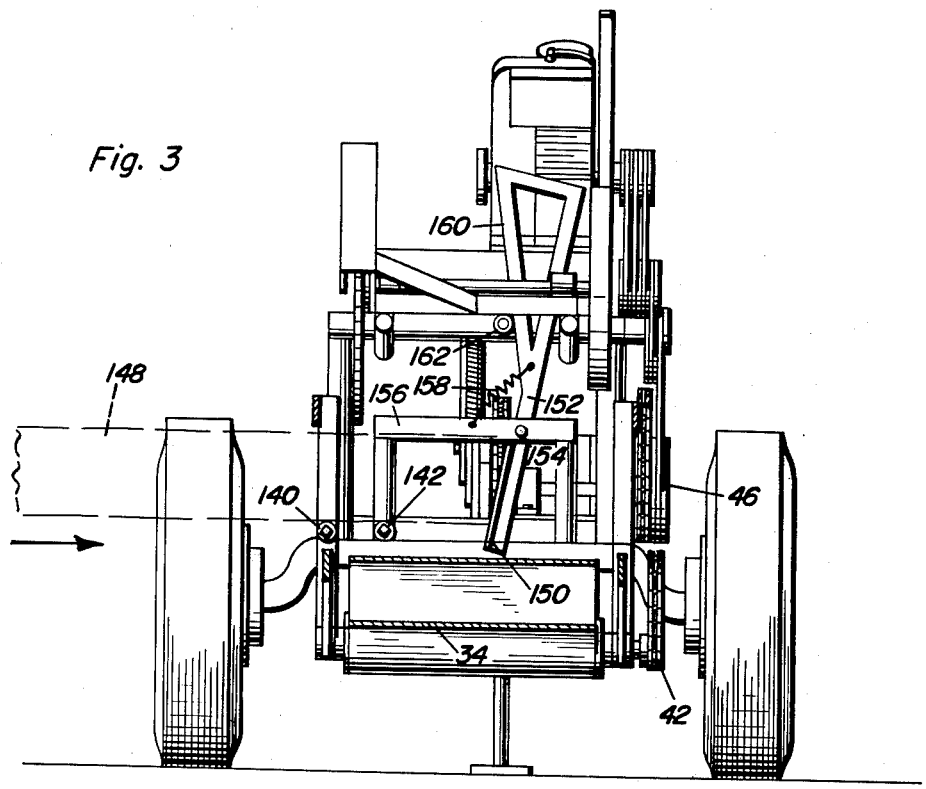
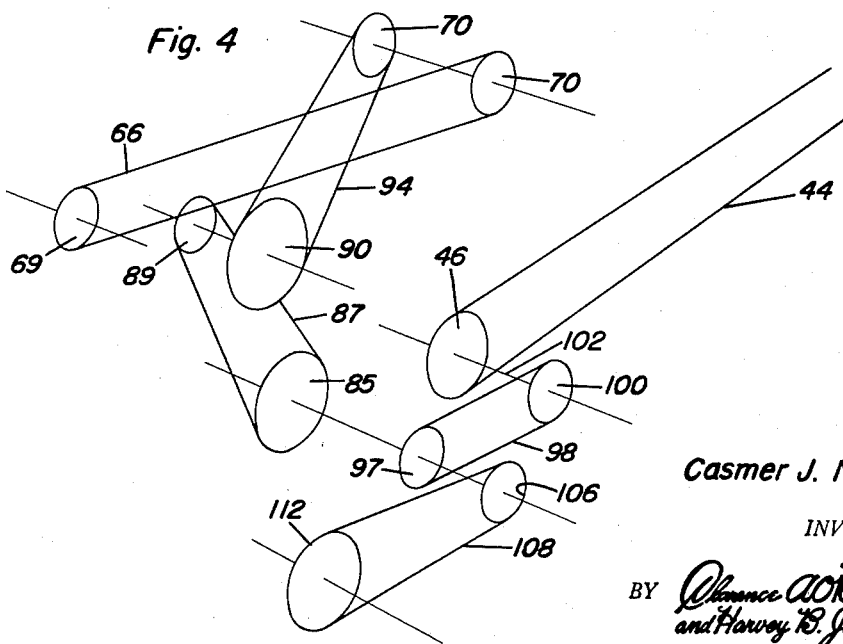

United States Patent Office 2,988,116
Patented June 13, 1961

2,988,116
ONE-MAN SAW RIG
Casmer J. Neumann, Rte. 2, Fountain City, Wis.
Filed Apr. 8, 1959, Ser. No. 804,944
3 Claims. (Cl. 143—46)

This invention relates to a saw rig capable of being both practically and successfully operated by one man.

An object of the invention is to provide a saw rig which is so constructed that logs are comparatively easily and rapidly cut by one man. The saw rig is automatic in its operation and portable so that it can be easily moved from one place to another to cut cordwood.

A further object of the invention is to provide a saw rig constructed of a chassis preferably mounted on wheels, together with a saw frame carried by the chassis and supporting a circular saw capable of being raised and lowered by power obtained from a single engine used not only to operate the saw and oscillate the saw supporting frame but also to operate a conveyor for removing the cut pieces of wood immediately after they are cut.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical transverse sectional view taken substantially upon the plane indicated by the section line 3—3 of FIGURE 1.

FIGURE 4 is a diagrammatic perspective view showing the drive arrangement by which the single engine is connected to the various components of the apparatus.

Figure 1:
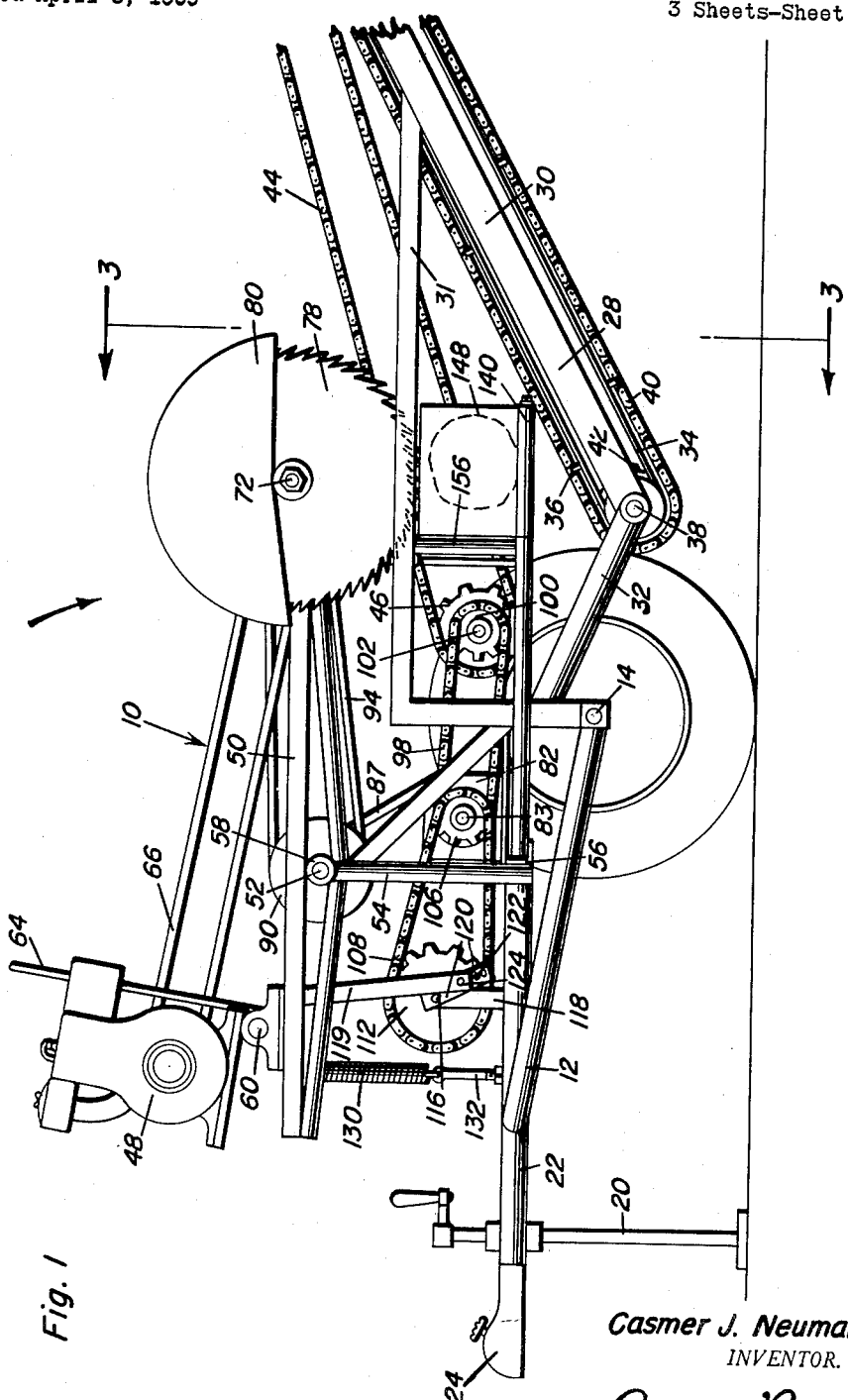
FIGURE 1 is a fragmentary side elevational view of the saw rig.

In the accompanying drawings there is disclosed a saw rig 10 including a chassis 12 to which axle 14 is secured. The axle has a pair of wheels 16 and 18 to support the chassis, together with an adjustable stand 20 at one end of the latter. Stand 20 is a screw jack attached to the tongue 22 of chassis 12. A trailer hitch 24 is likewise attached to the extremity of the tongue.

Chassis 12 is made of structural framework and braces suitable for support of all of the operative components of the saw rig, among which is an endless conveyor 28. The endless conveyor has its rectangular frame 30 supported by braces 31 and 32 on each side of the chassis, together with a conventional conveyor belt 34 on which transverse cleats 36 are affixed. The endless conveyor is conventional in all of its details and includes such conventional structures as a transverse spindle and roller 38 at each end of the endless conveyor (one not shown) together with a drive chain 40 engaged with a sprocket 42 fixed to each spindle and roller assembly 38. The conveyor drive chain 44 conventionally connects with the upper roller of the conveyor (not shown) and is driven by a sprocket 46 which ultimately obtains power from conventional engine 48.

Figure 2:
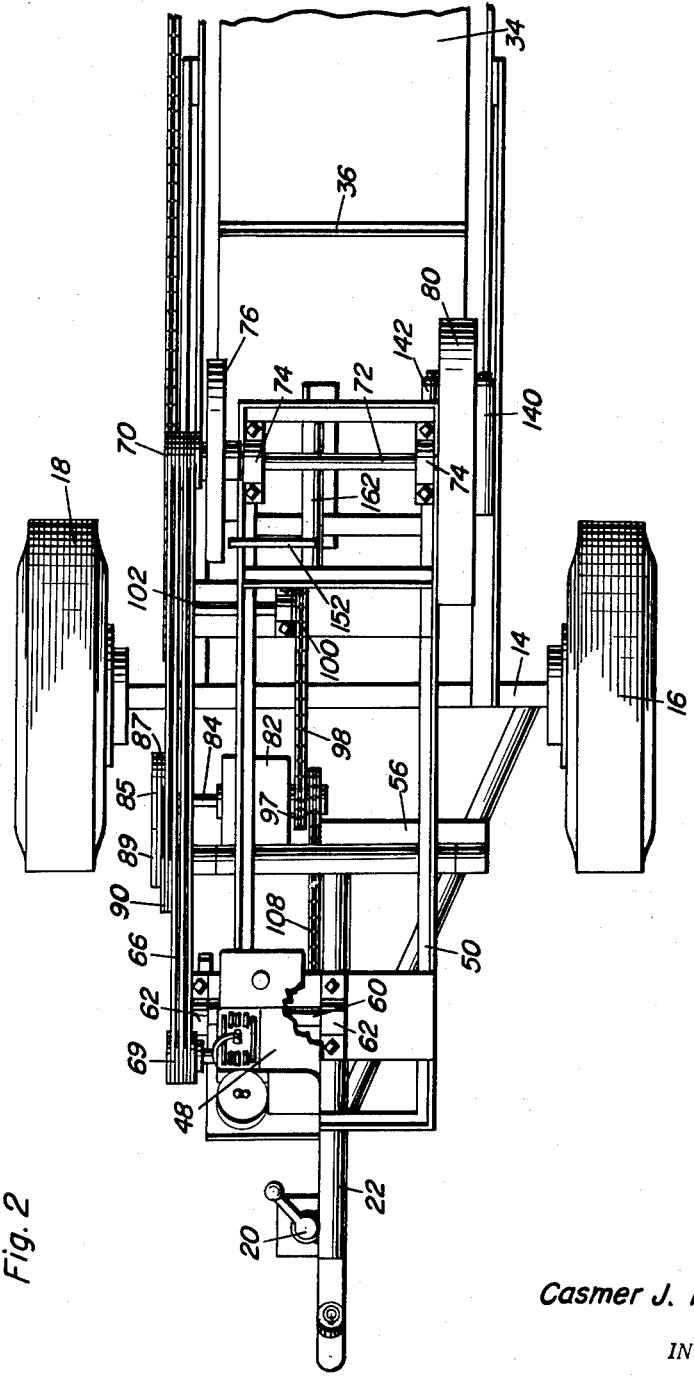
FIGURE 2 is a top plan view of the saw rig shown in FIGURE 1.

An oscillatable saw frame 50 is mounted above the general horizontal plane of the chassis 12 and is capable of oscillatory movement about the longitudinal axis of spindle 52. The spindle is supported on uprights 54 which are attached to a transverse brace 56 of chassis 12. Bearings 58 on the essentially rectangular frame 50, mount the frame 50 for oscillatory movement on the spindle 52. Engine 48 is mounted on a spindle 60 which is carried by bearings 62 near one end of frame 50 so that the entire engine is also capable of oscillation about the longitudinal axis of spindle 60. A handle 64 is attached to the engine 48 to swing the engine back and forth whereby the engine functions as a belt tightener for the driving belts 66. A group of the belts 66 are engaged with a multiple pulley 69 driven by engine 48. This group of belts is entrained around a multiple pulley 70 to which the saw shaft 72 is secured. The shaft 72 is mounted for rotation in bearings 74 (FIGURE 2) attached to frame 50 near the end thereof opposite from the end supporting the engine 48. Flywheel 76 is attached to saw shaft 72 and is located on one side of frame 50, and saw blade 78 beneath guard 80, is attached to the saw shaft 72 on the opposite side of frame 50. It is now evident that actuation of engine 48 will cause the saw blade 78 to be rotated.

Transmission 82, for instance an automotive type transmission, is carried by chassis 12 and is used as a means for speed reduction. The transmission 82 has a power input shaft 84 (FIGURE 2) on which pulley 85 is fixed. Belt 87 which may be single or multiple, is entrained around pulley 85 and around pulley 89 mounted for rotation on an axis coincident with the longitudinal axis of the frame pivot that is, spindle 52. Pulley 90 is on the same axis and has a belt 94 entrained therearound. The belt 94 extends and is engaged with pulley 70. It is now evident that the drive line for the sprocket 97 which is on the output shaft of the transmission is inclusive of belts 94 and 97, and the pulleys with which they engage, together with the internal mechanism (not shown) of the conventional transmission 82. Sprocket 97 has a chain 98 engaged with it, and this chain is engaged with another sprocket 100 on bearing mounted shaft 102. The shaft bearings are attached to the chassis 12, and power for operating the endless conveyor is obtained from shaft 102. Sprocket 46 is secured to the same shaft as sprocket 100, and the drive chain 44 for the endless conveyor is engaged with sprocket 46.

The power output shaft 83 of transmission 82 not only has sprocket 97 secured to it, but also there is a sprocket 106 attached to this shaft. Chain 108 is engaged with sprocket 106 and also engaged with a sprocket 112 which is the main drive sprocket for oscillating saw supporting frame 50. Sprocket 112 is mounted on a spindle 116, and the spindle is supported in bearings by means of short brackets 118, FIGURE 1, the latter being secured to chassis 12. Pitman 119 is pivoted to crank arm 120, and the crank arm is secured to spindle 116. A number of apertures 122 receiving drive pins 124 so that a selection for the throw of the pitman 119 may be obtained and drivingly connects pitman 119 with a part of the frame 50 inasmuch as the pitman is attached at its upper end to the frame 50. Return spring 130 is secured to frame 50 and to an adjustment bolt 132 which is connected to a part of the chassis 12.

A log cradle constructed of a pair of rollers 140 and 142, is on chassis 12 above the lower end of the endless conveyor. The logs are adapted to be fed into the cutting chamber above and while resting on the log cradle so that they may be saw cut. As the logs 148 are fed laterally into the log cutting chamber, the inner ends of the logs strike a stop plate 150, see FIGURE 3, at the lower part of stop frame 152. The stop frame is actually a lever since it is mounted on a pivot 154 between its upper and lower ends. The pivot is attached to a bracket 156, and the bracket is secured to chassis 12. Spring 158 is attached to the lever 152 and to the bracket 156 and provides a yielding bias for the lever.

As log 148 is projected into the cutting chamber the inner end of the log contacts plate 150. The upper part of lever 152 has a cam surface 160 in engagement with cam roller 162. Cam roller 162 is secured to frame 50 and moves up and down as the frame 50 is oscillated by pitman 118. When the frame moves up at the saw supporting end, roller 162 engages surface 160 causing the lever 152 to be pivoted about its pivot pin 154. In the full elevated position, the saw frame requires the stop plate 150 to be in a position which is determined by the height of movement of the saw blade supporting end of frame 50. Accordingly, the stroke of the pitman 119 as adjusted by selecting holes 122 for pin 124, will determine the final position of the stop plate 150 and hence, the length of cut for the log 148. The log 148 is manually fed into the saw cutting chamber until the end of the log strikes stop plate 150. Meanwhile the saw frame 50 commences its downward movement at the end supporting the saw blade 78. The log is cut while it is supported on the log cradle consisting of both rollers 140 and 142, and the severed end of the log falls onto the continually operating endless conveyor. However, as the cam roller 162 descends with the saw frame 50 supported blade 78, another part of cam 160 is contacted enabling the weight of the cut piece of log to compress spring 158 and pivot the lever 152 so that the log when completely severed, will topple onto the endless conveyor 34.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a one-man saw rig, the combination of a chassis which has an upright support, a transverse spindle carried by said upright support, an oscillatory frame mounted between its ends on said spindle for oscillatory movement, a saw blade supporting shaft carried at one end of said frame, power means drivingly connected with said spindle, a crank arm and pitman adjustably connected together, said pitman connected to said frame, means connected to said power means for actuating said crank arm and thereby oscillating said frame, a log cradle carried by said chassis beneath the saw blade to support a log beneath the saw blade for cutting the log as said saw blade is oscillated with said frame, a stop establishing the inner end of said cradle and against which the inner end of the log is adapted to bear, and means synchronized with the movement of said frame for moving said stop when said blade supporting end of the frame is lowered so that the log in said cradle automatically topples down after it is cut, said stop including a lever mounted for pivotal movement on said chassis, the upper end of said lever having a cam surface, cam means on said frame operating against said cam surface as said frame is raised and lowered.

2. The saw rig of claim 1 wherein there is a spring attached to said frame and to said chassis to oppose yieldingly the oscillatory movement of said frame in one direction.

3. The combination of claim 1 wherein there is an endless conveyor located beneath said cradle on which the severed logs fall after they are cut by the saw blade.

References Cited in the file of this patent

UNITED STATES PATENTS

| | | |
|---|---|---|
| 296,334 | Jones | Apr. 8, 1884 |
| 410,777 | Abbott | Sept. 10, 1889 |
| 632,640 | Butterfield | Sept. 5, 1899 |
| 817,628 | Cummiskey | Apr. 10, 1906 |
| 825,518 | Cox | July 10, 1906 |
| 1,262,943 | Gustafson | Apr. 16, 1918 |
| 2,889,858 | Roberts | June 9, 1950 |

FOREIGN PATENTS

| | | |
|---|---|---|
| 666,127 | France | May 14, 1929 |